United States Patent [19]

Rombult

[11] Patent Number: 5,299,066
[45] Date of Patent: Mar. 29, 1994

[54] CONICAL LENS MOUNT WITH SNAP-IN LENS CLAMP

[75] Inventor: Philip A. Rombult, Bradford, Mass.
[73] Assignee: Miles, Inc., Wilmington, Mass.
[21] Appl. No.: 929,760
[22] Filed: Aug. 12, 1992
[51] Int. Cl.⁵ ............................................. G02B 7/02
[52] U.S. Cl. ................................. 359/819; 359/815; 359/818
[58] Field of Search .................... 359/811–830, 359/808–830; 354/287

[56] References Cited

U.S. PATENT DOCUMENTS

| | | | |
|---|---|---|---|
| 3,942,226 | 3/1976 | Barnett et al. | 359/819 |
| 4,206,978 | 6/1980 | Leopoldi | 359/819 |
| 4,585,308 | 4/1986 | Negoro | 359/830 |
| 4,614,403 | 9/1986 | Kersten et al. | 359/830 |
| 4,720,167 | 1/1988 | Okura | 359/819 |
| 4,850,674 | 7/1989 | Hasselskog | 359/820 |

Primary Examiner—Bruce Y. Arnold
Assistant Examiner—Thong Nguyen
Attorney, Agent, or Firm—Richard J. Birch

[57] ABSTRACT

A conical lens mount having a snap-in lens clamp is disclosed. The lens mount has a hollow, truncated generally conical configuration with the lens mounted at the apex of the lens mount. The base portion of the conical lens mount defines a reference plane for use in an optical system. Preferably, the conical lens mount has integrally formed spring members for maintaining the lens mount and its reference plane at a predetermined position in an optical system. The conical lens mount finds particular application in an athermalized optical system.

6 Claims, 3 Drawing Sheets 5,299,066

CONICAL LENS MOUNT WITH SNAP-IN LENS CLAMP

CROSS-REFERENCE TO RELATED APPLICATION

The present application is related to U.S. patent application Ser. No. 07/927,607 filed Aug. 10, 1992 by Leah Ziph-Schatzberg, Joseph A. Wheeler and Philip A. Rombult for ATHERMALIZED OPTICAL SYSTEM AND METHOD.

BACKGROUND OF THE INVENTION

The present invention relates to lens mounting systems in general, and more particularly, to a conical lens mount having a snap-in lens clamp.

Various types of lens mounting systems from complex mechanical configurations to simple molded plastic mounts are known in the art. Depending upon the particular optical application, relatively tight mechanical tolerances are required to accurately position the lens in the optical system. In the case of athermalized optical systems, temperature effects on the optical elements and their mounts must be taken into consideration in system design.

It is, accordingly, a general object of the invention to provide a lens mount for use in an optical system.

It is a specific object of the invention to provide a lens mount having a truncated generally conical configuration for mounting a lens at the apex thereof.

It is another object of the invention to provide a conical lens mount having a snap-in lens clamp.

It is still another object of the invention to provide a conical lens mount having a base portion that defines a reference plane and integral springs to position the base reference plane against a surface in an optical system.

It is a further object of the invention to provide a conical lens mount fulfilling the above objects that can be molded from low cost plastic.

It is a feature of the invention that the conical lens mount can be employed in an athermalized optical system.

It is another feature of the invention that the conical shape of the lens mount provides relative movement of the mounted lens without a bearing mechanism.

It is still another feature of the invention that the conical shape of the lens mount provides structural integrity and resists creep deformation.

SUMMARY OF THE INVENTION

The lens mount has a hollow, truncated generally conical configuration for mounting a lens at the apex thereof. A snap-in lens clamp holds a lens in the lens mount. The annular base of the conical lens mount defines a reference plane. Preferably, the lens mount is molded of plastic and contains integrally molded springs that spring load position the mount at a predetermined location when the mount is incorporated into an optical system.

BRIEF DESCRIPTION OF THE DRAWINGS

The objects and features of the invention will best be understood from a detailed description of a preferred embodiment thereof, selected for purposes of illustration and shown in the accompanying drawings in which.

DETAILED DESCRIPTION OF A PREFERRED EMBODIMENT

Figure 1:
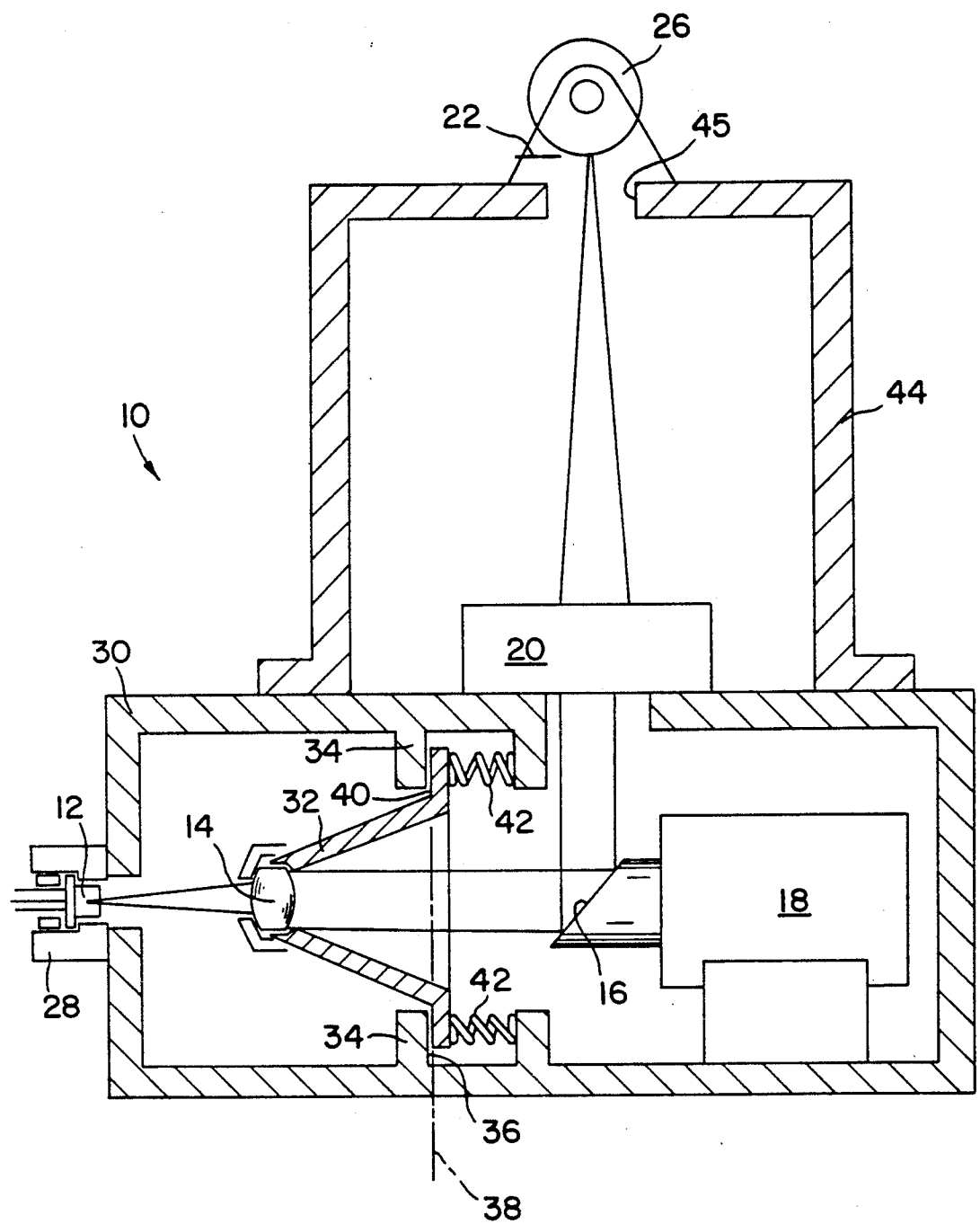
FIG. 1 is a simplified view in partial section of an athermalized imaging system incorporating the conical lens mount of the present invention.

Turning now to the drawings, and particularly to FIG. 1 thereof, there is shown in side elevation and partial section optical imaging apparatus indicated generally by the reference numeral 10. The imaging apparatus 10 comprises a light source such as, a semiconductor laser diode 12, a collimating lens 14, a rotating mirror 16 that is rotated by motor 18, a scan lens such as, an F-THETA scan lens 20, which images the beam from laser diode 12 onto an image plane locator 22 at which is positioned a photosensitive media 24 that is moved through the image or film plane 22 by a media transport 26. The collimating lens 14 produces a nominally collimated beam of light from the laser diode 12. The beam is scanned by the rotating mirror 16 and focused by scan lens 20 onto the image plane 22.

The structural elements of the imaging apparatus 10 are shown in FIG. 1. Starting with the light source laser diode 12, the laser diode is mounted in a mount 28 that is fixed with respect to an imager frame 30. The collimating lens 14 is positioned within the imager frame by means of a truncated generally conically shaped lens mount. The imager frame 30 has an inwardly extending annular portion 34 having a surface 36 that defines a fixed reference plane 38. The conically shaped lens mount 32 has an annular base 40 that is held against the reference plane 38 defined by surface 36 by spring loading provided by springs 42. The scan lens 20 is mounted at one end of an engine frame 44 having an aperture 45 through which the output beam from scan lens 20 is focused at image plane locator 22 that is mounted at the opposite end of the engine frame.

Figure 2:
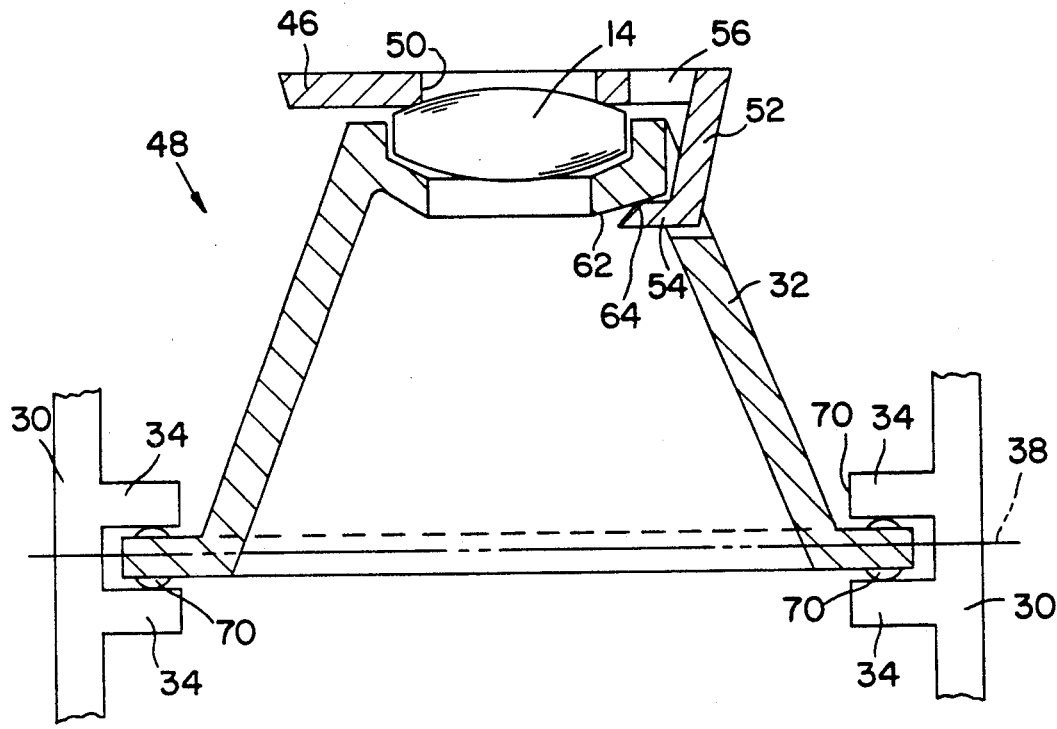
FIG. 2 is a view in partial section of the conical lens mount.
Figure 3:
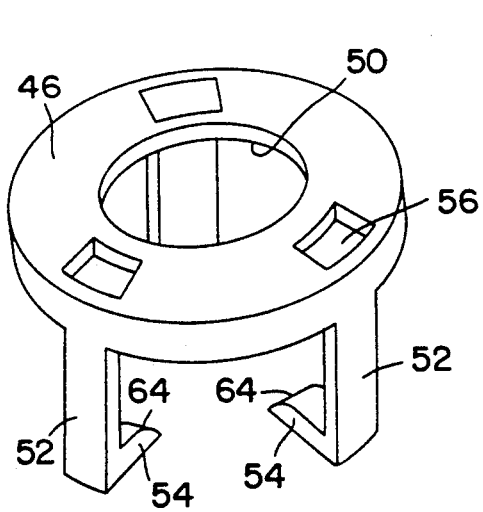
FIG. 3 is a view in perspective of a lens clamp having locking tangs for use with the clamp locators of the lens mount shown in FIG. 4.
Figure 4:
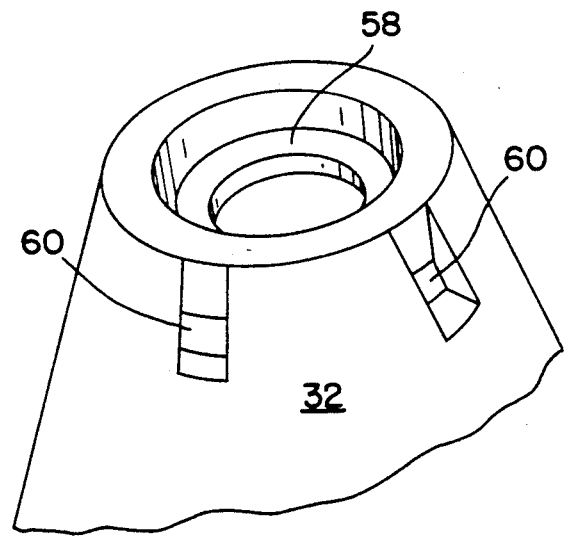
FIG. 4 is a view in perspective of the lens mounting portion of the conical lens mount showing the clamp locators for the locking tangs of the lens clamp of FIG. 3.

Turning now to FIGS. 2 through 4 there is shown in greater detail the components of the conical lens mount 32. The lens mount 32 and clamping ring 46 comprise a lens mount assembly indicated generally by the reference numeral 48. The lens clamp ring 46 has an annular bore 50 and a plurality of downwardly depending (as viewed in the Figures) locking tangs 52 each having a lens mount engaging tang 54. Preferably, the components of the lens mount assembly 48 are molded from a plastic material. Holes 56 are provided for molding purposes and do not constitute a portion of the invention.

The apex portion of the truncated generally conical lens mount 32 has a lens seat 58 to accommodate the previously mentioned collimating lens 14. The lens mount 32 also has a plurality of tang receiving apertures 60 corresponding in number to the downwardly depending locking tangs 52 shown in FIG. 3. Referring to FIGS. 2 and 3, the lens mount 32 has a tapered wedging surface 62 that cooperates with a wedge 64 formed in tang 54 that as assembled provides a force that seats lens 14 between lens seat 58 and the inner surface 66 of the clamping ring 46.

Figures 5, 6:
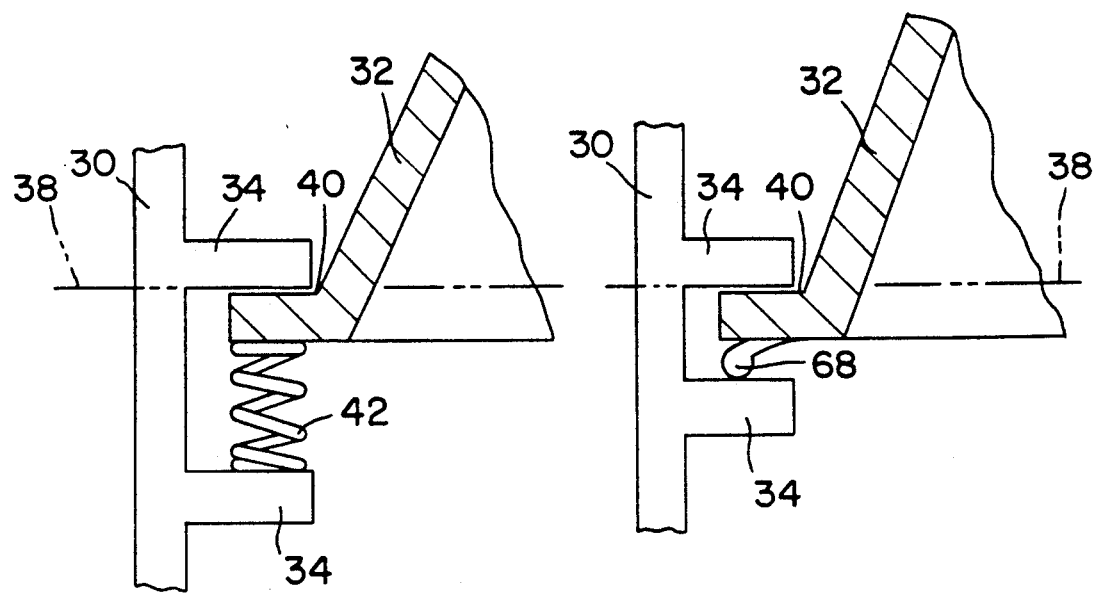
FIG. 5 is a view in side elevation and partial section showing in greater detail than FIG. 1 the relationship between the conical lens mount base and the compression springs.
FIG. 6 is another view in side elevation and partial section illustrating the use of integrally molded leaf springs for the conical lens mount; and, FIG. 7 is a view in side elevation of the apex portion of the conical lens mount and the lens clamp depicting an alternative structure for clamping and positioning the lens with a gasket to load the lens.

Looking at FIG. 5 is there shown in enlarged view and partial section a portion of the lower section of lens mount 32 with compression springs 42 forcing the reference plane surface 40 of the lens mount against the reference surface 36 of imager frame 30. This configuration is an enlarged view of that shown in FIG. 1.

A variety of other arrangements can be employed to provide the desired spring loading. For example, as shown in FIG. 6, the lens mount 32 has an integrally molded leaf spring 68. Another arrangement is shown in FIG. 2 in which a plurality of deformable protrusions 70 are located on the base portion 40 of lens mount 32.

Figure 7:
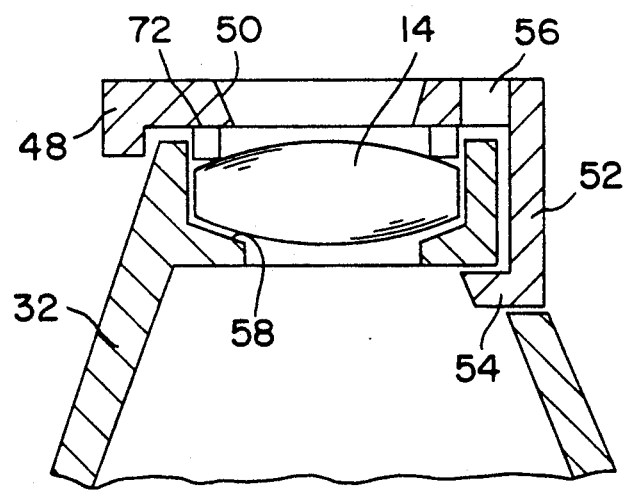

Referring to FIG. 7, there is shown an alternative configuration for providing the necessary loading force against lens 14. As shown in FIG. 7, the inwardly extending tang 54 is flat and does not have the wedging surface 64 depicted in FIGS. 2 and 3. A compressible and resilient gasket 72 is positioned between lens 14 and the inner surface of lens clamp ring 48. Compression of the gasket upon locking engagement of tangs 52 provides the loading in lens 14.

Having described in detail a preferred embodiment of the invention, it will now be obvious to those having skill in the art that numerous modifications can be made therein without departing from the scope of the invention as defined in the following claims.

What I claim is:

1. A lens mount assembly comprising:

a hollow, truncated generally conical lens mount having means defining a lens seat; and, a lens clamp ring for clamping engagement with said conical lens mount to hold a lens between the lens seat of said conical lens mount and said lens clamp ring, said lens clamp ring having a plurality of circumferentially spaced, axially extending locking tang means each having an inwardly extending tang and wherein said conical lens mount has a corresponding plurality of circumferentially spaced tang receiving apertures for receiving said lens clamp ring tangs in locking engagement therewith.

2. The lens mount assembly of claim 1 wherein each tang receiving aperture has a wedging surface and wherein each inwardly extending tang has a wedge portion adapted for wedging engagement with the corresponding tang receiving aperture wedging surface whereby a lens positioned between the lens clamp ring and the conical lens mount lens seat is held therebetween by the wedging engagement of the wedge portion of the tang and the wedging surface of the tang receiving aperture.

3. The lens mount assembly of claim 1 further comprising a compressible gasket ring means for seating a lens against the lens seat of the conical lens mount upon clamping engagement of the lens clamp ring with the conical lens mount.

4. The lens mount assembly of claim 1 wherein said hollow, truncated generally conical lens mount has a radially extending annular base portion.

5. The lens mount assembly of claim 4 further comprising leaf spring means mounted on said radially extending annular base portion for producing an axially directed force against said base portion upon compression of the leaf spring means.

6. The lens mount assembly of claim 5 wherein said conical lens mount is formed by molding and said leaf spring means are integrally molded with the conical lens mount.

* * * * *